US007930546B2

(12) United States Patent
Rhoads et al.

(10) Patent No.: US 7,930,546 B2
(45) Date of Patent: Apr. 19, 2011

(54) METHODS, SYSTEMS, AND SUB-COMBINATIONS USEFUL IN MEDIA IDENTIFICATION

(75) Inventors: Geoffrey B. Rhoads, West Linn, OR (US); Hugh L. Brunk, Portland, OR (US); Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 994 days.

(21) Appl. No.: 11/619,123

(22) Filed: Jan. 2, 2007

(65) Prior Publication Data

US 2007/0174059 A1 Jul. 26, 2007

Related U.S. Application Data

(63) Continuation-in-part of application No. 10/336,650, filed on Jan. 2, 2003, now Pat. No. 7,158,654, which is a continuation-in-part of application No. 10/202,367, filed on Jul. 22, 2002, now Pat. No. 6,704,869, which is a continuation of application No. 09/566,533, filed on May 8, 2000, now Pat. No. 6,424,725, which is a continuation-in-part of application No. 09/452,023, filed on Nov. 30, 1999, now Pat. No. 6,408,082, application No. 11/619,123, which is a continuation-in-part of application No. 09/186,962, filed on Nov. 5, 1998, now Pat. No. 7,171,016, which is a continuation of application No. 08/649,419, filed on May 16, 1996, now Pat. No. 5,862,260, application No. 11/619,123, which is a continuation-in-part of application No. 10/027,783, filed on Dec. 19, 2001, now Pat. No. 7,289,643, application No. 11/619,123, which is a continuation-in-part of application No. 10/338,031, filed on Jan. 6, 2003, which is a continuation of application No. 09/563,664, filed on Dec. 30, 1999, now Pat. No. 6,505,160.

(60) Provisional application No. 60/257,822, filed on Dec. 21, 2000, provisional application No. 60/263,490, filed on Jan. 22, 2001.

(51) Int. Cl.
*H04L 9/00* (2006.01)

(52) U.S. Cl. ........ 713/176; 713/167; 713/170; 713/180; 713/182; 382/100; 382/232; 726/10; 726/26; 726/30; 380/217; 380/201; 380/28; 380/51; 705/58; 705/57; 358/3.28; 704/273

(58) Field of Classification Search .................. 713/176, 713/167, 170, 180, 181, 182, 189, 168, 179; 382/100, 232; 726/10, 26, 30, 32, 27, 17; 380/217, 201, 28, 51; 705/58, 57, 59; 340/5.86; 358/3.28; 704/273
See application file for complete search history.

(56) References Cited

U.S. PATENT DOCUMENTS 4,179,586 A 12/1979 Mathews, Jr. et al.
(Continued)

FOREIGN PATENT DOCUMENTS

EP 905967 3/1999
(Continued)

OTHER PUBLICATIONS

Bonmassar et al., "Lie Groups, Space-Variant Fourier Analysis and the Exponential Chirp Transform", 1996 IEEE, pp. 492-498.

(Continued)

*Primary Examiner* — Vijay B Chawan

(57) ABSTRACT

Identification of media content, such as audio, can be performed through use of watermarking or fingerprinting (aka content signature) technologies. Aspects of these technologies may be combined to advantageous effect. For example, in dealing with the problem of fingerprint errors arising from object distortion, operations known from digital watermarking systems can be employed.

75 Claims, 4 Drawing Sheets

U.S. PATENT DOCUMENTS

| | | | | |
|---|---|---|---|---|
| 5,581,548 | A | 12/1996 | Ugland | |
| 5,646,997 | A | 7/1997 | Barton | |
| 5,721,788 | A | 2/1998 | Powell et al. | |
| 5,918,223 | A | 6/1999 | Blum | |
| 5,926,620 | A | 7/1999 | Klein | |
| 5,930,369 | A | 7/1999 | Cox et al. | |
| 5,963,957 | A | 10/1999 | Hoffberg | |
| 6,088,455 | A | 7/2000 | Logan | |
| 6,121,530 | A | 9/2000 | Sonoda | |
| 6,240,003 | B1 | 5/2001 | McElroy | |
| 6,345,104 | B1 | 2/2002 | Rhoads | |
| 6,385,329 | B1 | 5/2002 | Sharma et al. | |
| 6,408,082 | B1 | 6/2002 | Rhoads et al. | |
| 6,424,725 | B1 | 7/2002 | Rhoads et al. | |
| 6,425,081 | B1 | 7/2002 | Iwamura | |
| 6,442,285 | B2 | 8/2002 | Rhoads et al. | |
| 6,505,160 | B1 | 1/2003 | Levy et al. | |
| 6,522,769 | B1 | 2/2003 | Rhoads et al. | |
| 6,522,771 | B2 | 2/2003 | Rhoads | |
| 6,567,533 | B1 | 5/2003 | Rhoads | |
| 6,580,808 | B2 | 6/2003 | Rhoads | |
| 6,611,524 | B2 | 8/2003 | Devanagondi et al. | |
| 6,678,389 | B1 * | 1/2004 | Sun et al. | 382/100 |
| 6,700,990 | B1 | 3/2004 | Rhoads | |
| 6,740,875 | B1 * | 5/2004 | Ishikawa et al. | 250/302 |
| 6,785,421 | B1 | 8/2004 | Gindele et al. | |
| 6,785,815 | B1 * | 8/2004 | Serret-Avila et al. | 713/176 |
| 6,804,376 | B2 | 10/2004 | Rhoads et al. | |
| 6,829,368 | B2 | 12/2004 | Rhoads et al. | |
| 6,850,626 | B2 | 2/2005 | Rhoads et al. | |
| 6,870,547 | B1 | 3/2005 | Crosby et al. | |
| 6,931,451 | B1 | 8/2005 | Logan | |
| 6,941,275 | B1 | 9/2005 | Swierczek | |
| 6,965,682 | B1 | 11/2005 | Davis et al. | |
| 7,035,427 | B2 * | 4/2006 | Rhoads | 382/100 |
| 7,043,051 | B2 * | 5/2006 | Kuzmich et al. | 382/100 |
| 7,058,223 | B2 | 6/2006 | Cox | |
| 7,107,452 | B2 * | 9/2006 | Serret-Avila et al. | 713/176 |
| 7,113,614 | B2 * | 9/2006 | Rhoads | 382/100 |
| 7,171,018 | B2 | 1/2007 | Rhoads et al. | |
| 7,185,201 | B2 | 2/2007 | Rhoads et al. | |
| 7,197,368 | B2 * | 3/2007 | Kirovski et al. | 700/94 |
| 7,216,368 | B2 * | 5/2007 | Ishiguro | 726/32 |
| 7,248,715 | B2 | 7/2007 | Levy | |
| 7,248,717 | B2 * | 7/2007 | Rhoads | 382/100 |
| 7,269,275 | B2 | 9/2007 | Carr et al. | |
| 7,289,643 | B2 * | 10/2007 | Brunk et al. | 382/100 |
| 7,302,574 | B2 | 11/2007 | Conwell et al. | |
| 7,313,251 | B2 * | 12/2007 | Rhoads | 382/100 |
| 7,333,957 | B2 | 2/2008 | Levy et al. | |
| 7,349,552 | B2 | 3/2008 | Levy et al. | |
| 7,406,603 | B1 * | 7/2008 | MacKay et al. | 713/193 |
| 7,444,000 | B2 * | 10/2008 | Rhoads | 382/100 |
| 7,489,797 | B2 * | 2/2009 | Izquierdo | 382/100 |
| 7,505,605 | B2 | 3/2009 | Rhoads et al. | |
| 7,519,819 | B2 * | 4/2009 | Bradley et al. | 713/176 |
| 7,532,804 | B2 * | 5/2009 | Kim | 386/94 |
| 7,545,951 | B2 | 6/2009 | Davis et al. | |
| 7,562,392 | B1 | 7/2009 | Rhoads et al. | |
| 7,565,294 | B2 | 7/2009 | Rhoads | |
| 7,587,602 | B2 | 9/2009 | Rhoads | |
| 7,590,259 | B2 | 9/2009 | Levy et al. | |
| 7,593,576 | B2 | 9/2009 | Meyer et al. | |
| 7,650,010 | B2 | 1/2010 | Levy et al. | |
| 7,711,564 | B2 | 5/2010 | Levy et al. | |
| 2002/0023020 | A1 | 2/2002 | Kenyon | |
| 2002/0028000 | A1 | 3/2002 | Conwell | |
| 2002/0059580 | A1 | 5/2002 | Kalker | |
| 2002/0082731 | A1 | 6/2002 | Pitman | |
| 2004/0022444 | A1 * | 2/2004 | Rhoads | 382/232 |
| 2004/0148159 | A1 * | 7/2004 | Crockett et al. | 704/211 |
| 2004/0199387 | A1 | 10/2004 | Wang | |
| 2005/0043018 | A1 | 2/2005 | Kawamoto | |
| 2005/0141707 | A1 | 6/2005 | Haitsma et al. | |
| 2005/0286736 | A1 * | 12/2005 | Rhoads | 382/100 |
| 2006/0075237 | A1 | 4/2006 | Seo et al. | |
| 2007/0174059 | A1 | 7/2007 | Rhoads | |
| 2007/0250716 | A1 | 10/2007 | Brunk et al. | |
| 2008/0028223 | A1 | 1/2008 | Rhoads | |
| 2008/0092220 | A1 * | 4/2008 | Tan et al. | 726/9 |
| 2008/0133416 | A1 | 6/2008 | Rhoads | |
| 2008/0133556 | A1 | 6/2008 | Conwell et al. | |
| 2008/0139182 | A1 | 6/2008 | Levy et al. | |
| 2008/0140573 | A1 | 6/2008 | Levy et al. | |
| 2008/0270373 | A1 * | 10/2008 | Oostveen et al. | 707/5 |
| 2008/0319859 | A1 | 12/2008 | Rhoads | |
| 2009/0077604 | A1 | 3/2009 | Levy et al. | |
| 2009/0177742 | A1 | 7/2009 | Rhoads et al. | |
| 2010/0008586 | A1 | 1/2010 | Meyer et al. | |
| 2010/0009722 | A1 | 1/2010 | Levy et al. | |
| 2010/0036881 | A1 | 2/2010 | Rhoads et al. | |
| 2010/0046744 | A1 | 2/2010 | Rhoads et al. | |
| 2010/0138012 | A1 | 6/2010 | Rhoads | |
| 2010/0150395 | A1 | 6/2010 | Davis et al. | |
| 2010/0185306 | A1 | 7/2010 | Rhoads | |

FOREIGN PATENT DOCUMENTS

| | | |
|---|---|---|
| WO | WO9636163 | 11/1996 |
| WO | WO02065782 | 8/2002 |

OTHER PUBLICATIONS

Brandt et al., "Representations that Uniquely Characterize Images Modulo Translation, Rotation, and Scaling," Pattern Recognition Letters, Aug. 1, 1996, pp. 1001-1015.

Cano et al, "A Review of Audio Fingerprinting," Journal of VLSI Signal Processing, 41, pp. 271-274, 2005.

De Castro et al., "Registration of Translated and Rotated Images Using Finite Fourier Transforms," IEEE Transactions on Pattern Analysis and Machine Intelligence, vol. PAMI-9, No. 5, Sep. 1987, pp. 700-703.

Chen, et al, "Symmetric Phase-Only Matched Filtering of Fourier-Mellin Transforms for Image Registration and Recognition," IEEE Trans. On Pattern Analysis and Machine Intelligence, vol. 16, No. 12, Dec. 1994, pp. 1156-1168.

Dasgupta, "Fourier-Mellin Transform Based Image Matching Algorithm," Journal of the IETE, vol. 42, No. 1, Jan.-Feb. 1996, pp. 3-9.

Daugman, J.G. "Complete discrete 2-D Gabor transforms by neural networks for image analysis and compression", Acoustics, Speech and Signal Processing, IEEE Transactions on, vol. 36 Issue 78, Jul. 1988, pp. 1169-1179.

Digimarc presentation at RSA Conference, Jan. 1996, 4 pages.

Droppo, "Maximum a Posteriori Pitch Tracking," Proc. of 1998 ICSLP, vol. 3, pp. 943-946, Nov. 1998.

Haitsma et al, "A Highly Robust Audio Fingerprinting System," Proc. Intl Conf on Music Information Retrieval, 2002.

Haitsma et al, "Robust Audio Hashing for Content Identification," International Workshop on Content-Based Multimedia Indexing, 2001.

Oruanaidh et al., "Rotation, Scale and Translation Invariant Digital Image Watermarking," Aug. 1997, 4 pages.

Oskiper, "Detection of the first heart sound using a time-delay neural network," Computers in Cardiology, Sep. 22-25, 2002, pp. 537-540.

Pereira et al., "Template Based Recovery of Fourier-Based Watermarks Using Log-Polar and Log-Log Maps," IEEE Int. Conf on Multimedia Computing and Systems, (ICMCS'99) Florence, Italy, Jun. 1999.

O'Ruanaidh, J.J.K. O et al., "Phase Watermarking of digital images", IEEE 1996, pp. 239-242.

O'Ruanaidh, J.J.K. O et al, "Watermarking digital images for copyright protection", IEE Proc-Vis. Image Signal Process., vol. 143, No. 4, Aug. 1996, pp. 250-256.

Seo, "Linear Speed-Change Resilient Audio Fingerprinting," IEEE Benelux Workshop on Model based Processing and Coding of Audio (MPCA-2002), Leuven, Belgium, Nov. 15, 2002.

Sheng et al., "Experiments on Pattern Recognition Using Invariant Fourier-Mellin Descriptor," Journal of Optical Society of America, vol. 3, No. 6, Jun. 1986, pp. 771-776.

Sugahara et al., "Complex-Log Mapping Approach to Rotation and Enlargement or Reduction of Digital Images and its Performance Evaluation", 1996 IEEE pp. 1655-1660.

Szepanski, "A Signal Theoretic Method for Creating Forgery-Proof Documents for Automatic Verification," Proceedings 1979 Carnahan Conference on Crime Countermeasures, May 16, 1979, pp. 101-109.
Thornton et al., "Log-Polar Incorporating a Novel Spatially Variant Filter to Improve Object Recognition", IPA97, Jul. 15-17, 1997, Conference Publication No. 443, IEE, 1997, pp. 776-779.
Tistarelli et al, "On the Advantages of Polar and Log-Polar Mapping for Direct Estimation of Time-to-Impact From Optical Flow", Pattern Analysis and Machine Intelligence, IEEE Trans. on, vol. 15, Apr. 1993.
Toga et al, "Registration Revisited," Journal of Neuroscience Methods, 48 (1993), pp. 1-13.
Tsatsanis et al., "Object Detection and Classification Using Matched Filtering and High-Order Statistics", Multidimensional Signal Processing Workshop, 1989, Sixth, pp. 32-33.
Wang, Prosodic Modeling for Improved Speech Recognition and Understanding, PhD Thesis, MIT, Jun. 2001, 190 pp.
Weber et al., "Correlative Image Registration," Seminars in Nuclear Medicine, vol. XXIV, No. 4 Oct. 1994, pp. 311-323.
Yasi, "Yet Another Algorithm for Pitch Tracking," MS Thesis, Old Dominion University, Dec. 2002, 79 +xpp.
U.S. Appl. No. 09/574,726, filed May 18, 2000, Geoffrey B. Rhoads.
U.S. Appl. No. 09/515,826, filed Feb. 29, 2000, Geoffrey B. Rhoads.
U.S. Appl. No. 09/491,534, filed Jan. 26, 2000, Bruce L. Davis et al.
U.S. Appl. No. 09/337,590, filed Jun. 21, 1999, Geoffrey B. Rhoads.
U.S. Prosecution History of US Patent No. 7,289,643 obtained on Dec. 7, 2010.

* cited by examiner

METHODS, SYSTEMS, AND SUB-COMBINATIONS USEFUL IN MEDIA IDENTIFICATION

RELATED APPLICATION DATA

This application is a continuation-in-part of allowed application Ser. No. 10/336,650, filed Jan. 2, 2003(now U.S. Pat. No. 7,158,654), which is a continuation-in-part of application Ser. No. 10/202,367, filed Jul. 22, 2002 (now U.S. Pat. No. 6,704,869), which is a continuation of application Ser. No. 09/566,533, filed May 8, 2000 (now U.S. Pat. No. 6,424,725), which is a continuation-in-part of application Ser. No. 09/452,023, filed Nov. 30, 1999 (now U.S. Pat. No. 6,408, 082).

This application is also a continuation-in-part of allowed application Ser. No. 09/186,962, filed Nov. 5, 1998(now U.S. Pat. No. 7,171,016), which is a continuation of application Ser. No. 08/649,419, filed May 16, 1996 (now U.S. Pat. 5,862,260).

This application is also a continuation-in-part of application Ser. No. 10/027,783, filed Dec. 19, 2001(now U.S. Pat. No. 7,289,643), which claims priority to provisional applications 60/257,822, filed Dec. 21, 2000, and 60/263,490, filed Jan. 22, 2001.

This application is also a continuation-in-part of application Ser. No. 10/338,031, filed Jan. 6, 2003, which is a continuation of application Ser. No. 09/563,664, filed Dec. 30, 1999 (now U.S. Pat. No. 6,505,160).

The foregoing applications and patents are incorporated herein by reference.

FIELD OF THE INVENTION

The present invention concerns methods of processing electronic media content, e.g., for identification.

BACKGROUND AND SUMMARY

Advances in software, computers and networking systems have created many new and useful ways to distribute, utilize and access content items (e.g., audio, visual, and/or video signals). Content items are more accessible than ever before. As a result, however, content owners and users have an increasing need to identify, track, manage, handle, link content or actions to, and/or protect their content items.

These types of needs may be addressed by various means. One is digital watermarking.

Digital watermarking is the science of encoding physical and electronic objects with plural-bit digital data, in such a manner that the data is essentially hidden from human perception, yet can be recovered by computer analysis. In physical objects, the data may be encoded in the form of surface texturing, or printing. Such marking can be detected from optical scan data, e.g., from a scanner or web cam. In electronic objects (e.g., digital audio or imagery—including video), the data may be encoded as slight variations in sample values. Or, if the object is represented in a so-called orthogonal domain (also termed "non-perceptual," e.g., MPEG, DCT, wavelet, etc.), the data may be encoded as slight variations in quantization values or levels. The present assignee's U.S. Pat. No. 6,122,403, and application Ser. No. 09/503,881 (now U.S. Pat. No. 6,614,914), are illustrative of certain watermarking technologies.

Watermarking can be used to tag objects with a persistent digital identifier, and as such finds myriad uses. Some are in the realm of device control—e.g., tagging video data with a do-not-copy flag that is respected by compliant video recorders. (The music industry's Secure Digital Music Initiative (SDMI), and the motion picture industry's Copy Protection Technical Working Group (CPTWG), are working to establish standards relating to watermark usage for device control.) Other watermark applications are in the field of copyright communication, e.g., indicating that an audio track is the property of a particular copyright holder.

Other watermark applications encode data that serves to associate an object with a store of related data. For example, an image watermark may contain an index value that serves to identify a database record specifying (a) the owner's name; (b) contact information; (c) license terms and conditions, (d) copyright date, (e) whether adult content is depicted, etc., etc. (The present assignee's MarcCentre service provides such finctionality.) Related are so-called "connected content" applications, in which a watermark in one content object (e.g., a printed magazine article) serves to link to a related content object (e.g., a web page devoted to the same topic). The watermark can literally encode an electronic address of the related content object, but more typically encodes an index value that identifies a database record containing that address information. Application Ser. No. 09/571,422 (now U.S. Pat. No. 6,947,571) details a number of connected-content applications and techniques.

One problem that arises in some watermarking applications is that of object corruption. If the object is reproduced, or distorted, in some manner such that the content presented for watermark decoding is not identical to the object as originally watermarked, then the decoding process may be unable to recognize and decode the watermark. To deal with such problems, the watermark can convey a reference signal. The reference signal is of such a character as to permit its detection even in the presence of relatively severe distortion. Once found, the attributes of the distorted reference signal can be used to quantify the content's distortion. Watermark decoding can then proceed—informed by information about the particular distortion present.

The assignee's applications Ser. No. 09/503,881 (now U.S. Pat. No. 6,614,914) and Ser. No. 09/452,023 (now U.S. Pat. No. 6,408,082) detail certain reference signals, and processing methods, that permit such watermark decoding even in the presence of distortion. In some image watermarking embodiments, the reference signal comprises a constellation of quasi-impulse functions in the Fourier magnitude domain, each with pseudorandom phase. To detect and quantify the distortion, the watermark decoder converts the watermarked image to the Fourier magnitude domain and then performs a log polar resampling of the Fourier magnitude image. A generalized matched filter correlates the known orientation signal with the re-sampled watermarked signal to find the rotation and scale parameters providing the highest correlation. The watermark decoder performs additional correlation operations between the phase information of the known orientation signal and the watermarked signal to determine translation parameters, which identify the origin of the watermark message signal. Having determined the rotation, scale and translation of the watermark signal, the reader then adjusts the image data to compensate for this distortion, and extracts the watermark message signal as described above.

Another way of addressing the earlier-noted needs (concerning content identification, etc.), is content signature technology.

A content signature represents a corresponding content item. Preferably, a content signature is derived (e.g., calculated, determined, identified, created, etc.) as a function of the content item itself. The content signature can be derived through a manipulation (e.g., a transformation, mathematical representation, hash, etc.) of the content data. The resulting content signature may be utilized to identify, track, manage, handle, protect the content, link to additional information and/or associated behavior, and etc. Content signatures are also known as "robust hashes" and "fingerprints," and are used interchangeably throughout this disclosure.

Content signatures can be stored and used for identification of the content item. A content item is identified when a derived signature matches a predetermined content signature. A signature may be stored locally, or may be remotely stored. A content signature may even be utilized to index (or otherwise be linked to data in) a related database. In this manner, a content signature is utilized to access additional data, such as a content ID, licensing or registration information, other metadata, a desired action or behavior, and validating data. Other uses of a content signature may include identifying attributes associated with the content item, linking to other data, enabling actions or specifying behavior (copy, transfer, share, view, etc.), protecting the data, etc.

A content signature also may be stored or otherwise attached with the content item itself, such as in a header (or footer) or frame headers of the content item. Evidence of content tampering can be identified with an attached signature. Such identification is made through re-deriving a content signature using the same technique as was used to derive the content signature stored in the header. The newly derived signature is compared with the stored signature. If the two signatures fail to match (or otherwise coincide), the content item can be deemed altered or otherwise tampered with. This functionality provides an enhanced security and verification tool.

With the foregoing by way of background, the specification next turns to the various improvements. It will be recognized that these improvements can typically be employed in many applications, and in various combinations with the subject matter of the patent documents cited herein.

DETAILED DESCRIPTION

The following sections describe methods, apparatus, and/or programs for generating, identifying, handling, linking and utilizing content signatures. The terms "content signature," "fingerprint," "hash," and "signature" are used interchangeably and broadly herein. For example, a signature may include a unique identifier (or a fingerprint) or other unique representation that is derived from a content item. Alternatively, there may be a plurality of unique signatures derived from the same content item. A signature may also correspond to a type of content (e.g., a signature identifying related content items). Consider an audio signal. An audio signal may be divided into segments (or sets), and each segment may include a signature. Also, changes in perceptually relevant features between sequential (or alternating) segments may also be used as a signature. A corresponding database may be structured to index a signature (or related data) via transitions of data segments based upon the perceptual features of the content.

As noted above, a content signature is preferably derived as a function of the content item itself. In this case, a signature of a content item is computed based on a specified signature algorithm. The signature may include a number derived from a signal (e.g., a content item) that serves as a statistically unique identifier of that signal. This means that there is a high probability that the signature was derived from the digital signal in question. One possible signature algorithm is a hash (e.g., an algorithm that converts a signal into a lower number of bits). The hash algorithm may be applied to a selected portion of a signal (e.g., the first 10 seconds, a video frame or an image block, etc.) to create a signal. The hash may be applied to discrete samples in this portion, or to attributes that are less sensitive to typical audio processing. Examples of less sensitive attributes include most significant bits of audio samples or a low pass filtered version of the portion. Examples of hashing algorithms include MD5, MD2, SHA, and SHA1.

Figure 1:
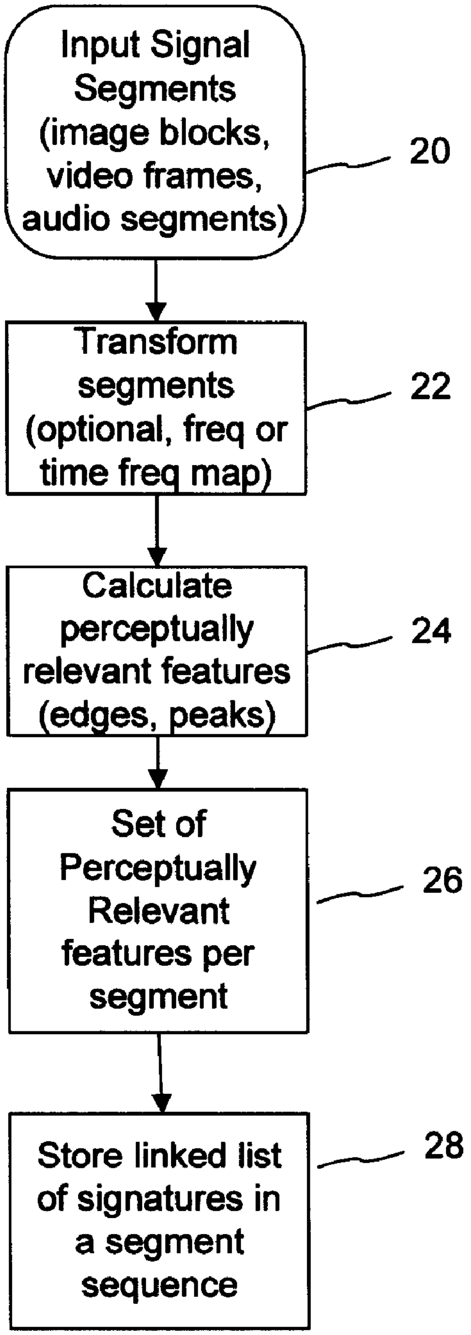
FIG. 1 is a flow diagram of a content signature generating method.

A more dynamic signature deriving process is discussed with respect to FIG. 1. With reference to FIG. 1, an input signal is segmented in step 20. The signal may be an audio, video, or image signal, and may be divided into sets such as segments, frames, or blocks, respectively. Optionally, the sets may be further reduced into respective sub-sets. In step 22, the segmented signal is transformed into a frequency domain (e.g., a Fourier transform domain), or time-frequency domain. Applicable transformation techniques and related frequency-based analysis are discussed in Assignee's Ser. No. 09/661,900 Patent Application, referenced above. Of course other frequency transformation techniques may be used.

A transformed set's relevant features (e.g., perceptual relevant features represented via edges; magnitude peaks, frequency characteristics, etc.) are identified per set in step 24. For example, a set's perceptual features, such as an object's edges in a frame or a transition of such edges between frames, are identified, analyzed or calculated. In the case of a video signal, perceptual edges may be identified, analyzed, and/or broken into a defining map (e.g., a representation of the edge, the edge location relevant to the segment's orientation, and/or the edge in relation to other perceptual edges.). In another example, frequency characteristics such as magnitude peaks having a predetermined magnitude, or a relatively significant magnitude, are used for such identifying markers. These identifying markers can be used to form the relevant signature.

Edges can also be used to calculate an object's center of mass, and the center of mass may be used as identifying information (e.g., signature components) for an object. For example, after thresholding edges of an object (e.g., identifying the edges), a centering algorithm may be used to locate an object's center of mass. A distance (e.g., up, down, right, left, etc.) may be calculated from the center of mass to each edge, or to a subset of edges, and such dimensions may be used as a signature for the object or for the frame. As an alternative, the largest object (or set of objects) may be selected for such center of mass analysis.

In another embodiment, a generalized Hough transform is used to convert content items such as video and audio signals into a signature. A continuous sequence of the signatures is generated via such a transform. The signature sequence can then be stored for future reference. The identification of the signature is through the transformation of the sequence of signatures. Trellis decoding and Viterbi decoding can be used in the database resolution of the signature.

In step 26, the set's relevant features (e.g., perceptual features, edges, largest magnitude peaks, center of mass, etc.) are grouped or otherwise identified, e.g., thorough a hash, mathematical relationship, orientation, positioning, or mapping to form a representation for the set. This representation is preferably used as a content signature for the set. This content signature may be used as a unique identifier for the set, an identifier for a subset of the content item, or as a signature for the entire content item. Of course, a signature need not be derived for every set (e.g., segment, frame, or block) of a content item. Instead, a signature may be derived for alternating sets or for every nth set, where n is an integer of one or more.

As shown in step 28, resulting signatures are stored. In one example, a set of signatures, which represents a sequence of segments, frames or blocks, is linked (and stored) together. For example, signatures representing sequential or alternating segments in an audio signal may be linked (and stored) together. This linking is advantageous when identifying a content item from a partial stream of signatures, or when the signatures representing the beginning of a content item are unknown or otherwise unavailable (e.g., when only the middle 20 seconds of an audio file are available). When perceptually relevant features are used to determine signatures, a linked list of such signatures may correspond to transitions in the perceptually relevant data between frames (e.g., in video). A hash may also be optionally used to represent such a linked list of signatures.

There are many possible variations for storing a signature or a linked list of signatures. The signature may be stored along with the content item in a file header (or footer) of the segment, or otherwise be associated with the segment. In this case, the signature is preferably recoverable as the file is transferred, stored, transformed, etc. In another embodiment, a segment signature is stored in a segment header (or footer). The segment header may also be mathematically modified (e.g., encrypted with a key, XORed with an ID, etc.) for additional security. The stored content signature can be modified by the content in that segment, or hash of content in that segment, so that it is not recoverable if some or all of content is modified, respectively. The mathematical modification helps to prevent tampering, and to allow recovery of the signature in order to make a signature comparison. Alternatively, the signatures may be stored in a database instead of, or in addition to, being stored with the content item. The database may be local, or may be remotely accessed through a network such as a LAN, WAN, wireless network or internet. When stored in a database, a signature may be linked or associated with additional data. Additional data may include identifying information for the content (e.g., author, title, label, serial numbers, etc.), security information (e.g., copy control), data specifying actions or behavior (e.g., providing a URL, licensing information or rights, etc.), context information, metadata, etc.

To illustrate one example, software executing on a user device (e.g., a computer, PVR, MP3 player, radio, etc.) computes a content signature for a content item (or segments within the content item) that is received or reviewed. The software helps to facilitate communication of the content signature (or signatures) to a database, where it is used to identify the related content item. In response, the database returns related information, or performs an action related to the signature. Such an action may include linking to another computer (e.g., a web site that returns information to the user device), transferring security or licensing information, verifying content and access, etc.

Figure 2:
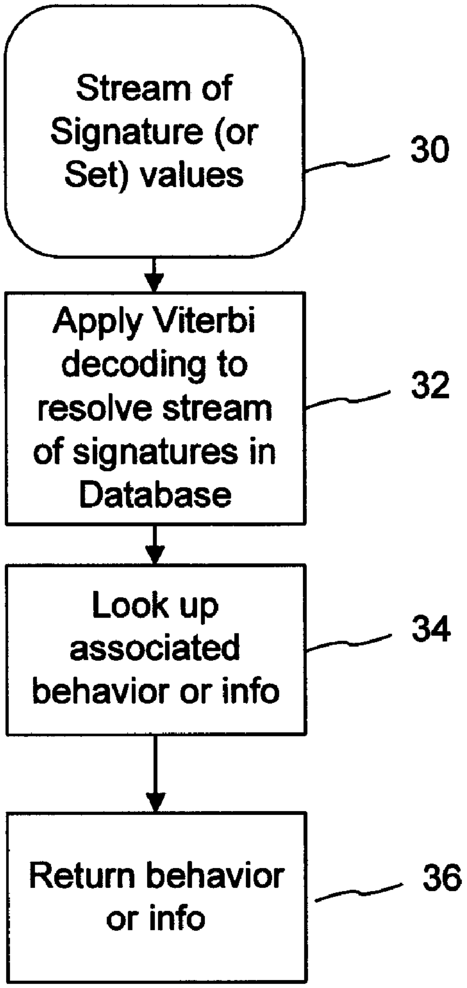
FIG. 2 is a flow diagram of a content signature decoding method.

FIG. 2 is a flow diagram illustrating one possible method to identify a content item from a stream of signatures (e.g., a linked set of consecutive derived signatures for an audio signal). In step 32, Viterbi decoding (as discussed further below) is applied according to the information supplied in the stream of signatures to resolve the identify of the content item. The Viterbi decoding efficiently matches the stream to the corresponding content item. In this regard, the database can be thought of as a trellis structure of linked signatures or signature sequences. A Viterbi decoder can be used to match (e.g., corresponding to a minimum cost finction) a stream with a corresponding signature in a database. Upon identifying the content item, the associated behavior or other information is indexed in the database (step 34). Preferably, the associated behavior or information is returned to the source of the signature stream (step 36).

Figure 3:
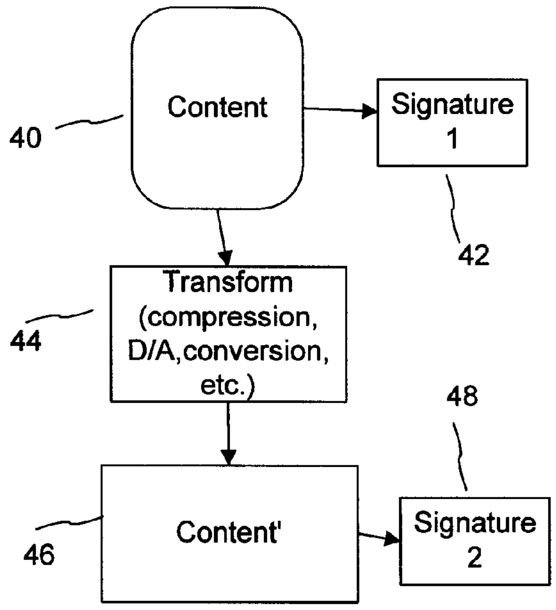
FIG. 3 is a diagram illustrating generation of a plurality of signatures to form a list of signatures.
Figure 4:
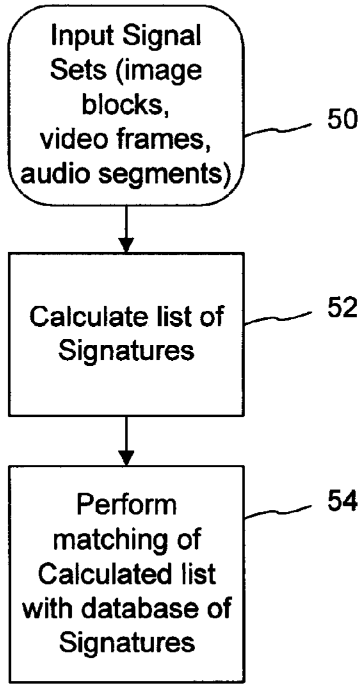
FIG. 4 is a flow diagram illustrating a method to resolve a content ID of an unknown content item.

FIGS. 3 and 4 are diagrams illustrating an embodiment in which a plurality of content signatures is utilized to identify a content item. As illustrated in FIG. 3, a content signature 42 is calculated or determined (e.g., derived) from content item 40. The signature 42 may be determined from a hash (e.g., a manipulation which represents the content item 40 as an item having fewer bits), a map of key perceptual features (magnitude peaks in a frequency-based domain, edges, center of mass, etc.), a mathematical representation, etc. The content 40 is manipulated 44, e.g., compressed, transformed, D/A converted, etc., to produce content' 46. A content signature 48 is determined from the manipulated content' 46. Of course, additional signatures may be determined from the content, each corresponding to a respective manipulation. These additional signatures may be determined after one manipulation from the original content 40, or the additional signatures may be determined after sequential manipulations. For example, content' 46 may be further manipulated, and a signature may be determined based on the content resulting from that manipulation. These signatures are then stored in a database. The database may be local, or may be remotely accessed through a network (LAN, WAN, wireless, internet, etc.). The signatures are preferably linked or otherwise associated in the database to facilitate database look-up as discussed below with respect to FIG. 4.

FIG. 4 is a flow diagram illustrating a method to determine an identification of an unknown content item. In step 50, a signal set (e.g., image block, video frame, or audio segment) is input into a system, e.g., a general-purpose computer programmed to determine signatures of content items. A list of signatures is determined in step 52. Preferably, the signatures are determined in a corresponding fashion as discussed above with respect to FIG. 3. For example, if five signatures for a content item, each corresponding to a respective manipulation (or a series of manipulations) of the content item, are determined and stored with respect to a subject content item, then the same five signatures are preferably determined in step 52. The list of signatures is matched to the corresponding signatures stored in the database. As an alternative embodiment, subsets or levels of signatures may be matched (e.g., only 2 of the five signatures are derived and then matched). The security and verification confidence increases as the number of signatures matched increases.

A set of perceptual features of a segment (or a set of segments) can also be used to create "fragile" signatures. The number of perceptual features included in the signature can determine its robustness. If the number is large, a hash could be used as the signature.

Digital Watermarks and Content Signatures

Content signatures may be used advantageously in connection with digital watermarks.

A digital watermark may be used in conjunction with a content signature. The watermark can provide additional information, such as distributor and receiver information for tracking the content. The watermark data may contain a content signature and can be compared to the content signature at a later time to determine if the content is authentic. A content signature also can be compared to digital watermark data, and if the content signature and digital watermark data match (or otherwise coincide) the content is determined to be authentic. If different, however, the content is considered modified.

A digital watermark may be used to scale the content before deriving a content signature of the content. Content signatures are sensitive to scaling (and/or rotation, distortion, etc.). A watermark can include a calibration and/or synchronization signal to realign the content to a base state. Or a technique can be used to determine a calibration and/or synchronization based upon the watermark data during the watermark detection process. This calibration signal (or technique) can be used to scale the content so it matches the scale of the content when the content signature was registered in a database or first determined, thus reducing errors in content signature extraction.

Indeed, a content signature can be used to identify a content item (as discussed above), and a watermark is used to supply additional information (owner ID, metadata, security information, copy control, etc). The following example is provided to further illustrate the interrelationship of content signatures and digital watermarks.

A new version of the Rolling Stones song "Angie" is ripped (e.g., transferred from one format or medium to another). A compliant ripper or a peer-to-peer client operating on a personal computer reads the watermark and calculates the signature of the content (e.g., "Angie"). To ensure that a signature may be rederived after a content item is routinely altered (e.g., rotated, scaled, transformed, etc.), a calibration signal can be used to realign (or retransform) the data before computing the signature. Realigning the content item according to the calibration signal helps to ensure that the content signature will be derived from the original data, and not from an altered original. The calibration signal can be included in header information, hidden in an unused channel or data area, embedded in a digital watermark, etc. The digital watermark and content signature are then sent to a central database. The central database determines from the digital watermark that the owner is, for example, Label X. The content signature is then forwarded to Label X's private database, or to data residing in the central database (depending upon Label X's preference), and this secondary database determines that the song is the new version of "Angie." A compliant ripper or peer-to-peer client embeds the signature (i.e., a content ID) and content owner ID in frame headers in a fashion secure to modification and duplication, and optionally, along with desired ID3v2 tags.

To further protect a signature (e.g., stored in a header or digital watermark), a content owner could define a list of keys, which are used to scramble (or otherwise encrypt) the signature. The set of keys may optionally be based upon a unique ID associated with the owner. In this embodiment, a signature detector preferably knows the key, or gains access to the key through a so-called trusted third party. Preferably, it is optimal to have a signature key based upon content owner ID. Such a keying system simplifies database look-up and organization. Consider an example centered on audio files. Various record labels may wish to keep the meaning of a content ID private. Accordingly, if a signature is keyed with an owner ID, the central database only needs to identify the record label's content owner ID (e.g., an ID for BMG) and then it can forward all BMG songs to a BMG database for their response. In this case, the central database does not need all of the BMG content to forward audio files (or ID's) to BMG, and does not need to know the meaning of the content ID. Instead, the signature representing the owner is used to filter the request.

Content Signature Calculations

For images or video, a content signature can be based on a center of mass of an object or frame, as discussed above. An alterative method is to calculate an object's (or frame's) center of mass is to multiply each pixel's luminescence with its location from the lower left corner (or other predetermined position) of the frame, sum all pixels within the object or frame, and then divide by the average luminescence of the object or frame. The luminescence can be replaced by colors, and a center of mass can be calculated for every color, such as RGB or CMYK, or one color. The center of mass can be calculated after performing edge detection, such as high pass filtering. The frame can be made binary by comparing to a threshold, where a 1 represents a pixel greater than the threshold and a 0 represents a pixel less than the threshold. The threshold can be arbitrary or calculated from an average value of the frame color, luminescence, either before or after edge detection. The center of mass can produce a set of values by being calculated for segments of the frame, in images or video, or for frames over time in video.

Similarly, the average luminescence of a row or block of a frame can be used as the basic building block for a content signature. The average value of each row or block is put together to represent the signature. With video, there could be the calculation of rows and blocks over time added to the set of values representing the signature.

The center of mass can be used for object, when the objects are predefined, such as with MPEG. The center of mass for each object is sequentially combined into a content signature.

A technique of generating a fingerprint—seemingly not known in the art—is to select frames (video or MP3 segments, etc.) pseudorandomly, based on a known key, and then performing a hashing or other lossy transformation process on the frames thus selected.

Content Signature Applications

One longstanding application of such technology has been in monitoring play-out of radio advertising. Advertisements are "fingerprinted," and the results stored in a database. Monitoring stations then process radio broadcasts looking for audio that has one of the fingerprints stored in the database. Upon finding a match, play-out of a given advertisement is confirmed.

Some fingerprinting technology may employ a "hash" function to yield the fingerprint. Others may take, e.g., the most significant bit of every $10^{th}$ sample value to generate a fingerprint. Etc., etc. A problem arises, however, if the content is distorted. In such case, the corresponding fingerprint may be distorted too, wrongly failing to indicate a match.

In accordance with this aspect of the presently-disclosed technology, content is encoded with a steganographic reference signal by which such distortion can be identified and quantized. If the reference data in a radio broadcast indicates that the audio is temporally scaled (e.g., by tape stretch, or by psycho-acoustic broadcast compression technology), the amount of scaling can be determined. The resulting information can be used to compensate the audio before fingerprint analysis is performed. That is, the sensed distortion can be backed-out before the fingerprint is computed. Or the fingerprint analysis process can take the known temporal scaling into account when deriving the corresponding fingerprint. Likewise with distorted image and video. By such approaches, fingerprint technology is made a more useful technique.

(Pending application Ser. No. 09/452,023, filed Nov. 30, 1999, details such a reference signal (sometimes termed a "grid" signal, and its use in identifying and quantizing distortion. Pending application Ser. No. 09/689,250 details various fingerprint techniques.)

In a variant system, a watermark payload—in addition to the steganographic reference signal—is encoded with the content. Thus, the hash (or other fingerprint) provides one identifier associated with the content, and the watermark provides another. Either can be used, e.g., to index related information (such as connected content). Or they can be used jointly, with the watermark payload effectively extending the ID conveyed by the hash (or vice versa).

In addition, the grid signal discussed above may consist of tiles, and these tiles can be used to calibrate content signatures that consist of a set of sub-fingerprints. For example, the tile of the grid can represent the border or block for each of the calculations of the sub-fingerprints, which are then combined into a content signature.

A technique similar to that detailed above can be used in aiding pattern recognition. Consider services that seek to identify image contents, e.g., internet porn filtering, finding a particular object depicted among thousands of frames of a motion picture, or watching for corporate trademarks in video media. (Cobion, of Kassel, Germany, offers some such services.) Pattern recognition can be greatly for-shortened if the orientation, scale, etc., of the image are known. Consider the Nike swoosh trademark. It is usually depicted in horizontal orientation. However, if an image incorporating the swoosh is rotated 30 degrees, its recognition is made more complex.

To redress this situation, the original image can be steganographically encoded with a grid (calibration) signal as detailed in the Ser. No. 09/452,023 application. Prior to performing any pattern recognition on the image, the grid signal is located, and indicates that the image has been rotated 30 degrees. The image can then be counter-rotated before pattern recognition is attempted.

Fingerprint technology can be used in conjunction with digital watermark technology in a variety of additional ways. Consider the following.

One is to steganographically convey a digital object's fingerprint as part of a watermark payload. If the watermark-encoded fingerprint does not match the object's current fingerprint, it indicates the object has been altered.

A watermark can also be used to trigger extraction of an object's fingerprint (and associated action based on the fingerprint data). Thus, one bit of a watermark payload, may signal to a compliant device that it should undertake a fingerprint analysis of the object.

In other arrangements, the fingerprint detection is performed routinely, rather than triggered by a watermark. In such case, the watermark can specify an action that a compliant device should perform using the fingerprint data. (In cases where a watermark triggers extraction of the fingerprint, a further portion of the watermark can specify a further action.) For example, if the watermark bit has a "0" value, the device may respond by sending the fingerprint to a remote database; if the watermark bit has a "1" value, the fingerprint is stored locally.

Still further, frail (or so-called fragile) watermarks can be used in conjunction with fingerprint technology. A frail or fragile watermark is designed to be destroyed, or to degrade predictably, upon some form of signal processing. In the current fingerprinting environment, if a frail watermark is detected, then a fingerprint analysis is performed; else not. And/or, the results of a fingerprint analysis can be utilized in accordance with information conveyed by a frail watermark. (Frail watermarks are disclosed, e.g., in application Ser. Nos. 09/234,780, 09/433,104, 60/198,138, 09/616,462, 09/645,779, 60/232,163, 09/689,293, and 09/689,226.)

Content Signatures from Compressed Data

Content signatures can be readily employed with compressed or uncompressed data content. One inventive method determines the first n significant bits (where n is an integer, e.g., 64) of a compression signal and uses the n bits as (or to derive) a signature for that signal. This signature technique is particularly advantageous since, generally, image compression schemes code data by coding the most perceptually relevant features first, and then coding relevantly less significant features from there. Consider JPEG 2000 as an example. As will be appreciated by those skilled in that art, JPEG 2000 uses a wavelet type compression, where the image is hierarchically sub-divided into sub-bands, from low frequency perceptually relevant features, to higher frequency lesser perceptually relevant features. Using the low frequency information as a signature (or a signature including a hash of this information) creates a perceptually relevant signature.

The largest frequency components from a content item (e.g., a video signal) can use the compressed or uncompressed data to determine a signature. For example, in an MPEG compressed domain, large scaling factors (e.g., 3 or more of the largest magnitude peaks) are identified, and these factors are used as a content signature or to derive (e.g., a mapping or hash of the features) a content signature. As an optional feature, a content item is low pass filtered to smooth rough peaks in the frequency domain. As a result, the large signature peaks are not close neighbors.

Continuing this idea with time varying data, transitions in perceptually relevant data of frames of audio/video over time can be tracked to form a unique content signature. For example, in compressed video, a perceptually relevant hash of n frames can be used to form a signature of the content. In audio, the frames correspond to time segments, and the perceptually relevant data could be defined similarly, based on human auditory models, e.g., taking the largest frequency coefficients in a range of frequencies that are the most perceptually significant. Accordingly, the above inventive content signature techniques are applicable to compressed data, as well as uncompressed data.

Cue Signals and Content Signatures

Cue signals are an event in the content, which can signal the beginning of a content signature calculation. For example, a fade to black in video could be a cue to start calculating (e.g., deriving) the content signature, either for original entry into the database or for database lookup.

If the cue signal involves processing, where the processing is part of the content signature calculation, the system will be more efficient. For example, if the content signature is based upon frequency peaks, the cue signal could be a specific pattern in the frequency components. As such, when the cue signal is found, the content signature is partially calculated, especially if the content signature is calculated with content before the cue (which should be saved in memory while searching for the cue signal). Other cue signals may include, e.g., I-frames, synchronization signals, and digital watermarks.

In the broadcast monitoring application, where the presence and amount of content is measured, such as an advertisement on TV, timing accuracy (e.g., with a 1 sec.) is required. However, cue signals do not typically occur on such a regular interval (e.g., 1 sec.). As such, content signatures related to a cue signal can be used to identify the content, but the computation of the content to locate the cue signal elements are saved to determine timing within the identified content. For example, the cue signal may include the contrast of the center of the frame, and the contrast from frame to frame represents the timing of the waveform and is saved. The video is identified from several contrast blocks, after a specific cue, such as fade to black in the center. The timing is verified by comparing the pre-existing and future contrasts of the center frame to those stored in the database for the TV advertisement.

Content signatures are synchronized between extraction for entry into the database and for extraction for identifying the unknown content by using peaks of the waveform envelope. Even when there is an error calculating the envelope peak, if the same error occurs at both times of extraction, the content signatures match since they are both different by the same amount; thus, the correct content is identified.

List Decoding and Trellis Coded Quantization

The following discussion details another method, which uses Trellis Coded Quantization (TCQ), to derive a content signature from a content item. Whereas the following discussion uses an image for an example, it will be appreciated by one of ordinary skill in the art that the concepts detailed below can be readily applied to other content items, such as audio, video, etc. For this example, an image is segmented into blocks, and real numbers are associated with the blocks. In a more general application of this example, a set of real numbers is provided and a signature is derived from the set of real numbers.

Initial Signature Calculation

Figure 5:
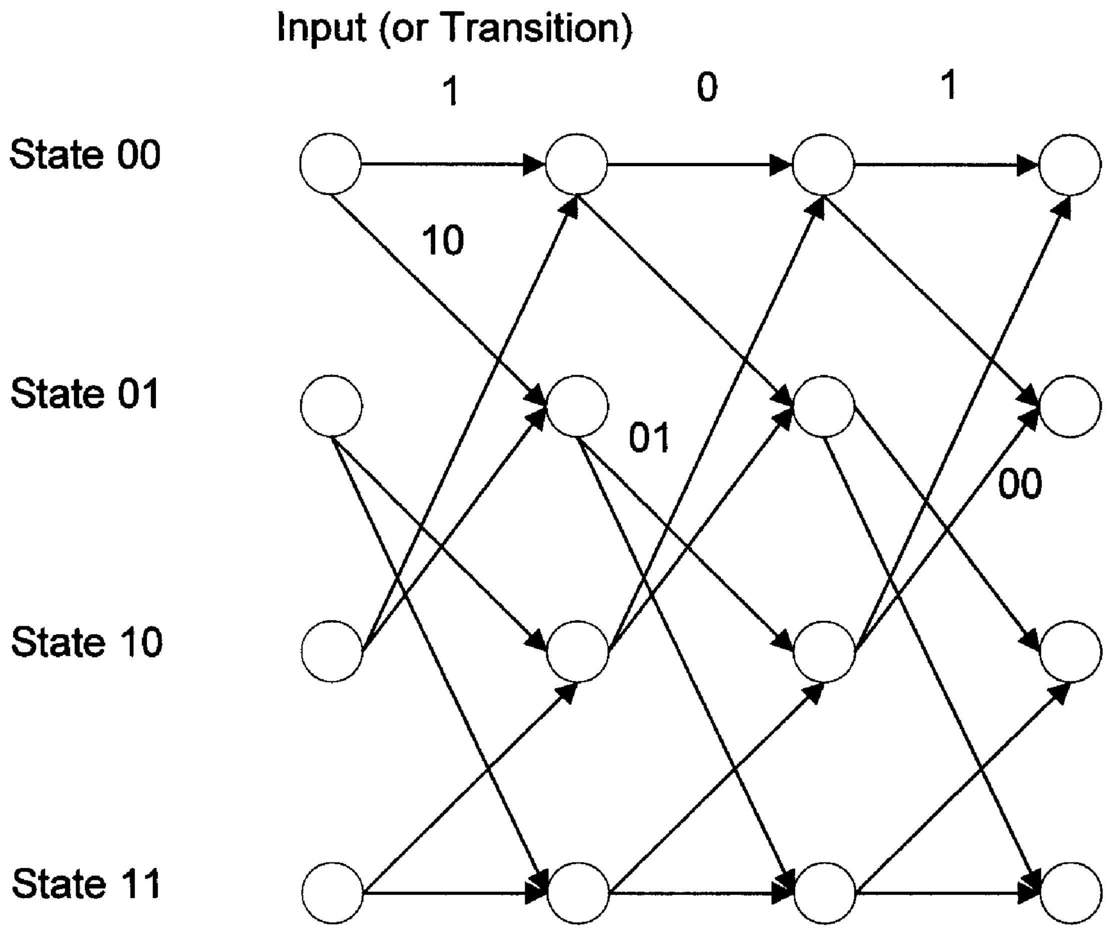
FIG. 5 illustrates an example of a trellis diagram.
Figure 6:
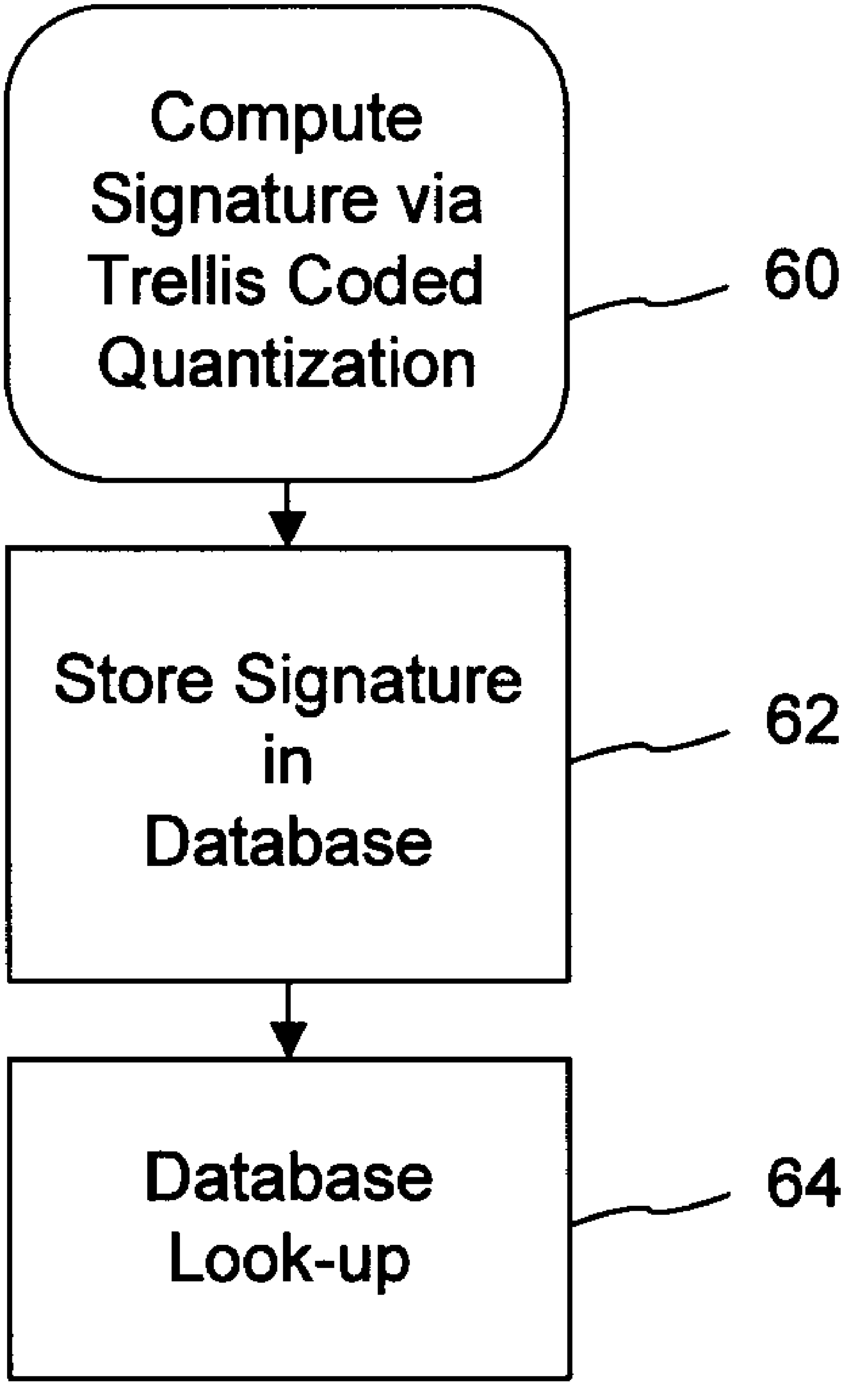
FIG. 6 is a flow diagram illustrating a method of applying Trellis Coded Quantization to generate a signature.

In step 60 of FIG. 6, TCQ is employed to compute an N-bit hash of N real numbers, where N is an integer. The N real numbers may correspond to (or represent) an image, or may otherwise correspond to a data set. This method computes the hash using a Viterbi algorithm to calculate the shortest path through a trellis diagram associated with the N real numbers. A trellis diagram, a generalized example of which is shown in FIG. 5, is used to map transition states (or a relationship) for related data. In this example, the relationship is for the real numbers. As will be appreciated by those of ordinary skill in the art, the Viterbi algorithm finds the best state sequence (with a minimum cost) through the trellis. The resulting shortest path is used as the signature. Further reference to Viterbi Decoding Algorithms and trellis diagrams may be had to "List Viterbi Decoding Algorithms with Applications," IEEE Transactions on Communications, Vol. 42, No. 2/3/4, 1994, pages 313-322, hereby incorporated by reference.

One way to generate the N real numbers is to perform a wavelet decomposition of the image and to use the resulting coefficients of the lowest frequency sub-band. These coefficients are then used as the N real numbers for the Viterbi decoding (e.g., to generate a signature or hash).

One way to map a larger set of numbers M to an N bit hash, where M>N and M and N are integers, is to use trellis coded vector quantization, where the algorithm deals with sets of real numbers, rather than individual real numbers. The size and complexity for a resulting signature may be significantly reduced with such an arrangement.

In step 62 (FIG. 6), the initial signature (e.g., hash) is stored in a database. Preferably, the signature is associated with a content ID, which is associated with a desired behavior, information, or action. In this manner, a signature may be used to index or locate additional information or desired behavior.

Recalculating Signatures for Matching in the Database

In a general scenario, a content signature (e.g., hash) is recalculated from the content item as discussed above with respect to Trellis Coded Quantization.

In many cases, however, a content signal will acquire noise or other distortion as it is transferred, manipulated, stored, etc. To recalculate the distorted content signal's signature (e.g., calculate a signature to be used as a comparison with a previously calculated signature), the following steps may be taken. Generally, list decoding is utilized as a method to identify the correct signature (e.g., the undistorted signature). As will be appreciated by one of ordinary skill in the art, list decoding is a generalized form of Viterbi decoding, and in this application is used to find the most likely signatures for a distorted content item. List decoding generates X the most likely signatures for the content item, where X is an integer. To do so, a list decoding method finds the X shortest paths (e.g., signatures) through a related trellis diagram. The resulting X shortest paths are then used as potential signature candidates to find the original signature.

As an alternative embodiment, and before originally computing the signature (e.g., for storage in the database), a calibration watermark is embedded in the content item, and possibly with one or more bits of auxiliary data. A signature is then calculated which represents the content with the watermark signal. The calibration watermark assists in re-aligning the content after possible distortion when recomputing a signature from a distorted signal. The auxiliary data can also be used as an initial index into the database to reduce the complexity of the search for a matching a signature. Database lookup time is reduced with the use of auxiliary data.

In the event that a calibration watermark is included in the content, the signature is recomputed after re-aligning the content data with calibration watermark. Accordingly, a signature of the undistorted, original (including watermark) content can be derived.

Database Look-up

Once a content signature (e.g., hash) is recalculated in one of the methods discussed above, a database query is executed to match recalculated signatures against stored signatures, as shown in step 64 (FIG. 6). This procedure, for example, may proceed according to known database querying methods.

In the event that list decoding generates X most likely signatures, the X signatures are used to query the database until a match is found. Auxiliary data, such as provided in a watermark, can be used to further refine the search. A user may be presented with all possible matches in the event that two or more of the X signatures match signatures in the database.

A progressive signature may also be used to improve database efficiency. For example, a progressive signature may include a truncated or smaller hash, which represents a smaller data set or only a few (out of many) segments, blocks or frames. The progressive hash may be used to find a plurality of potential matches in the database. A more complete hash can then be used to narrow the field from the plurality of potential matches. As a variation of this progressive signature matching technique, soft matches (e.g., not exact, but close matches) are used at one or more points along the search. Accordingly, database efficiency is increased.

Database lookup for content signatures can use a database configuration based upon randomly addressable memory (RAM). In this configuration, the database can be pre-organized by neighborhoods of related content signatures to speed detection. In addition, the database can be searched in conventional methods, such as binary tree methods.

Given that the fingerprint is of fixed size, it represents a fixed number space. For example, a 32-bit fingerprint has 4 billion potential values. In addition, the data entered in the database can be formatted to be a fixed size. Thus, any database entry can be found by multiplying the fingerprint by the size of the database entry size, thus speeding access to the database.

Content Addressable Memory

Another inventive alternative uses a database based on content addressable memory (CAM) as opposed to RAM. CAM devices can be used in network equipment, particularly routers and switches, computer systems and other devices that require content searching.

Operation of a CAM device is unlike that of a RAM device. For RAM, a controller provides an address, and the address is used to access a particular memory location within the RAM memory array. The content stored in the addressed memory location is then retrieved from the memory array. A CAM device, on the other hand, is interrogated by desired content. Indeed, in a CAM device, key data corresponding to the desired content is generated and used to search the memory locations of the entire CAM memory array. When the content stored in the CAM memory array does not match the key data, the CAM device returns a "no match" indication. When the content stored in the CAM memory array matches the key data, the CAM device outputs information associated with the content. Further reference to CAM technology can be made to U.S. Pat. Nos. 5,926,620 and 6,240,003, which are each incorporated herein by reference.

CAM is also capable of performing parallel comparisons between input content of a known size and a content table completely stored in memory, and when it finds a match it provides the desired associated output. CAM is currently used, e.g., for Internet routing. For example, an IP address of 32 bits can be compared in parallel with all entries in a corresponding 4-gigabit table, and from the matching location the output port is identified or linked to directly. CAM is also used in neural networks due to the similarity in structure. Interestingly, it is similar to the way our brain fimctions, where neurons perform processing and retain the memory—as opposed to Van Neumann computer architecture, which has a CPU, and separate memory that feeds data to the CPU for processing.

CAM can also be used in identifying fingerprints with metadata.

For file based fingerprinting, where one fingerprint uniquely identifies the content, the resulting content fingerprint is of a known size. CAM can be used to search a complete fingerprint space as is done with routing. When a match is found, the system can provide a web link or address for additional information/metadata. Traditionally CAM links to a port, but it can also link to memory with a database entry, such as a web address.

CAM is also useful for a stream-based fingerprint, which includes a group of sub-fingerprints. CAM can be used to look up the group of sub-fingerprints as one content signature as described above.

Alternatively, each sub-fingerprint can be analyzed with CAM, and after looking up several sub-fingerprints one piece of content will be identified, thus providing the content signature. From that content signature, the correct action or web link can quickly be found with CAM or traditional RAM based databases.

More specifically, the CAM can include the set of sub-fingerprints with the associated data being the files that include those sub-fingerprints. After a match is made in CAM with an input sub-fingerprint, the complete set of sub-fingerprints for each potential file can be compared to the set of input fingerprints using traditional processing methods based upon hamming errors. If a match is made, the file is identified. If not, the next sub-fingerprint is used in the above process since the first sub-fingerprint must have had an error. Once the correct file is identified, the correct action or web link can quickly be found with CAM or traditional RAM-based databases, using the unique content identification, possibly a number or content name.

Varying Content

Some content items may be represented as a sequence of N bit signatures, such as time varying audio and video content. A respective N bit signature may correspond to a particular audio segment, or video frame, such as an I frame. A database may be structured to accommodate such a structure or sequence.

In one embodiment, a calibration signal or some other frame of reference (e.g., timing, I frames, watermark counter, auxiliary data, header information, etc.) may be used to synchronize the start of the sequence and reduce the complexity of the database. For example, an audio signal may be divided into segments, and a signature (or a plurality of signatures) may be produced for such segments. The corresponding signatures in the database may be stored or aligned according to time segments, or may be stored as a linked list of signatures.

As an alternative, a convolution operation is used to match an un-synchronized sequence of hashes with the sequences of hashes in the database, such as when a synchronization signal is not available or does not work completely. In particular, database efficiency may be improved by a convolution operation such as a Fast Fourier Transform (FFT), where the convolution essentially becomes a multiplication operation. For example, a 1-bit hash may be taken for each segment in a sequence. Then to correlate the signatures, an inverse FFT is taken of the 1-bit hashes. The magnitude peaks associated with the signatures (and transform) are analyzed. Stored signatures are then searched for potential matches. The field is further narrowed by taking progressively larger signatures (e.g., 4-bit hashes, 8-bit hashes, etc.).

As a further alternative, a convolution plus a progress hash is employed to improve efficiency. For example, a first sequence of 1-bit hashes is compared against stored signatures. The matches are grouped as a potential match sub-set. Then a sequence of 2-bit hashes is taken and compared against the second sub-set—further narrowing the potential match field. The process repeats until a match is found.

Dual Fingerprint Approach

An efficiently calculated content signature can be used to narrow the search to a group of content. Then, a more accurate and computationally intense content signature can be calculated on minimal content to locate the correct content from the group. This second more complex content signature extraction can be different than the first simple extraction, or it can be based upon further processing of the content used in the first, but simple, content signature. For example, the first content signature may include peaks of the envelope, and the second content signature comprises the relative amplitude of each Fourier component as compared to the previous component, where a 1 is created when the current component is greater than the previous and a 0 is created when the current component is less than or equal to the previous component As another example, the first content signature may include the three largest Fourier peaks, and the second content signature may include the relative amplitude of each Fourier component, as described in the previous example.

Using Fourier Mellin Transform in Watermark Detection

The following sections (taken from application Ser. No. 09/452,023, now U.S. Pat. No. 6,408,082) describe a watermark detection process that employs a Fourier Mellin Transform. For the purpose of this discussion, the process is adapted to detecting a watermark in an image. A similar process may be used for other empirical data sets such as audio and video. FIG. 1 of U.S. Pat. No. 6,408,082 is a flow diagram illustrating an overview of an implementation of the detection process. The following sections cross-reference the diagram through reference numbers.

The objective of the detection process shown in FIG. 1 of U.S. Pat. No. 6,408,082 is to determine whether a watermark is present, and if so, its orientation within the target image. The orientation approximates a geometric transform that the original media content has experienced as a result of intentional or unintentional corruption.

Capturing Data Sets

The detection process begins by capturing one or more data sets from the target data (100, 102). In the case of an image, the target data is an image (the target image 102), and the data sets are blocks of pixels taken from this image.

Transform Data Set to Frequency Domain

Next, the detection process transforms the data sets into the frequency domain (104). In particular, it performs a fourier transform of an image block from the spatial domain to a spatial frequency domain.

Noise Reduction Functions

The process may optionally apply one or more pre-processing functions to reduce the impact of unwanted noise on the detection process. For example, in one implementation, the detection process adds two or more image blocks together to increase the embedded signal to noise ratio. Filtering may also be employed to attenuate signal having little, if any, watermark information.

Transform to Log Polar Coordinate System

Next, the process transforms the data set to a log polar coordinate system (106). One implementation performs a Fourier Mellin transform to map the data set from the spatial frequency domain to a log-polar coordinate system.

Correlation with the Watermark Pattern to Find Rotation and Scale

At this stage, the detection process correlates the watermark pattern (108) with the data set in the log-polar coordinate system to find rotation and scale parameters (110, 112). A variety of correlation processes may be used to implement this phase. For example, there is a general class of such correlation processes that are referred to as generalized matched filters. One implementation employs a generalized matched filter to determine the rotation and scale parameters for the block of interest.

Using Rotation and Scale to get Translation

Having determined rotation and scale parameters, the detection process proceeds to conduct further correlation to find the translation parameter for the block of interest (114). Using the rotation and scale parameters as a starting point, the detection process conducts additional block matching to determine the translation parameter (116). In particular, one implementation rotates and scales the block of interest and then searches the block to find the location within the block that most closely matches the watermark pattern. This location provides the translation parameters, e.g., the coordinates of a reference position within the block.

Example Implementation

FIG. 2 of U.S. Pat. No. 6,408,082 depicts the detection process shown in that patent's FIG. 1 as applied to an image. In the illustrated detector implementation, the target image is divided into blocks of pixels, e.g., 128 by 128 pixel blocks, which form the data sets for the detection process. The detection process operates on these data sets to look for a watermark, and if one is identified, to compute an orientation vector.

Before elaborating on implementation details, it is helpful to begin with an overview of the watermark structure. As noted above, the watermark may be implemented in a variety of ways. In the context of images, for example, it may be applied to the original content in the spatial domain, in a frequency domain, or some combination of these domains. The specific values of the watermark used to alter discrete samples of the image may be expressed in the spatial or frequency domain. For example, the watermark samples may be expressed as having some value and location in the spatial and or frequency domain. In addition, the value of a watermark sample may be a function of position in a given domain and may be a function of the corresponding image sample that it alters. For example, it may be expressed as a "delta function" that alters the corresponding image sample depending on the value of that image sample.

Components of the watermark may perform the function of conveying information content, identifying the watermark's orientation, or both of these functions. The detection process is primarily concerned with the watermark's ability to identify its orientation.

The watermark used in the implementation illustrated in FIG. 2 of U.S. Pat. No. 6,408,082 has a grid component that helps identify the watermark's orientation in a corrupted image. FIG. 3 of that patent illustrates one quadrant of this grid component in the spatial frequency domain. The points in the plot represent impulse functions (also referred to as grid points), indicating signal content of the detection watermark signal. The pattern of grid points for the illustrated quadrant is replicated in all four quadrants. There are a number of properties of the detection pattern that impact its effectiveness for a particular application. The selection of these properties is highly dependent on the application. One property is the extent to which the pattern is symmetric about one or more axes. For example, if the detection pattern is symmetrical about the horizontal and vertical axes, it is referred to as being quad symmetric. If it is further symmetrical about diagonal axes at an angle of 45 degrees, it is referred to as being octally symmetric (repeated in a symmetric pattern 8 times about the origin). Such symmetry aids in identifying the watermark in an image, and aids in extracting the rotation angle. However, in the case of an octally symmetric pattern, the detector includes an additional step of testing which of the four quadrants the orientation angle falls into.

Another criterion is the position of the grid points and the frequency range that they reside in. Preferably, the grid points fall in a mid frequency range. If they are located in a low frequency range, they may be noticeable in the watermarked image. If they are located in the high frequency range, they are more difficult to recover. Also, they should be selected so that scaling, rotation, and other manipulation of the watermarked signal does not push the grid points outside the range of the detector. Finally, the grid points should preferably not fall on the vertical or horizontal axes, and each grid point should have a unique horizontal and vertical location.

As explained below, the detector performs correlation processes between this grid pattern (or a transformed version of it) and transformed data sets extracted from the target image.

Returning to the process depicted in FIG. 2 of U.S. Pat. No. 6,408,082, the detector segments the target image into blocks (e.g., 200, 202) and then performs a 2-dimensional fast Fourier transform (2D FFT) on each block. This process yields a 2D transform of the magnitudes of the image content of the block in the spatial frequency domain as depicted in the plot 204.

Next, the detector process performs a log polar remapping of the transformed block. The type of remapping in this implementation is referred to as a Fourier Mellin transform. The Fourier Mellin transform is a geometric transform that warps the image data from a frequency domain to a log polar coordinate system. As depicted in the plot 206 shown in FIG. 2 of U.S. Pat. No. 6,408,082, this transform sweeps through the. transformed image data along a line at angle θ, mapping the data to a log polar coordinate system shown in the next plot 208. The log polar coordinate system has a rotation axis, representing the angle θ, and a scale axis. Inspecting the transformed data at this stage, one can see the grid points of the watermark begin to be distinguishable from the noise component of the image signal.

Next, the detector performs a correlation 210 between the transformed image block and the transformed grid 212. At a high level, the correlation process slides the grid over the transformed image (in a selected transform domain, such as a spatial frequency domain) and measures the correlation at an array of discrete positions. Each such position has a corresponding scale and rotation parameter associated with it. Ideally, there is a position that clearly has the highest correlation relative to all of the others. In practice, there may be several candidates with a promising measure of correlation. As explained further below, these candidates may be subjected to one or more additional correlation stages to select the one that provides the best match for the grid pattern.

There are a variety of ways to implement the correlation process. Any number of generalized matching filters may be implemented for this purpose. FIG. 4 of U.S. Pat. No. 6,408,082 depicts one such type of generalized matching filter. This filter, sometimes referred to as a Fourier Magnitude filter, performs an FFT on the target and the grid (400, 402), and multiplies the resulting arrays together to yield a multiplied FFT (406). The filtering operation is a form of convolution of the grid with the target image. In particular, the filter repeatedly re-positions, multiplies the corresponding samples of the grid and target, and accumulates the result at the corresponding location in the resulting array. Finally, it performs an inverse FFT (408) on the multiplied FFT to return the data into its original log-polar domain. The position or positions within this resulting array with the highest magnitude represent the candidates with the highest correlation.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

It should be appreciated that the above section headings are not intended to limit the present disclosure, and are merely provided for the reader's convenience. Of course, subject matter disclosed under one section heading can be readily combined with subject matter under other headings.

The methods, processes, and systems described above may be implemented in hardware, software or a combination of hardware and software. For example, the transformation and signature deriving processes may be implemented in a programmable computer running executable software or a special purpose digital circuit. Similarly, the signature deriving and matching process and/or database functionality may be implemented in software, electronic circuits, firmware, hardware, or combinations of software, firmware and hardware. The methods and processes described above may be implemented in programs executed from a system's memory (a computer readable medium, such as an electronic, optical, magnetic-optical, or magnetic storage device).

The particular combinations of elements and.features in the above-detailed embodiments are exemplary only; the interchanging and substitution of these teachings with other teachings in this and the incorporated-by-reference patents/applications are also contemplated.

We claim:

1. A method useful in identifying media content, the content including audio data, the method comprising:
- pre-processing the audio data;
- deriving characteristic audio fingerprint data from the pre-processed data; and
- sending the characteristic audio fingerprint data to a database, which can identify earlier-stored data that corresponds to the characteristic audio fingerprint data to thereby identify content that matches the media content;
- wherein the pre-processing comprises performing a log-mapping process based on a frequency-domain representation of the audio data to yield logarithmically-sampled data, prior to deriving the characteristic audio fingerprint data.

2. The method of claim 1, wherein the pre-processing further comprises transforming the audio data to a frequency domain representation.

3. The method of claim 1, wherein the pre-processing further comprises generating audio power spectrum data corresponding to the frequency-domain representation, and performing a log-mapping process based on the audio power spectrum data.

4. The method of claim 1, wherein the pre-processing comprises identifying segments of the audio data, and wherein the deriving comprises deriving characteristic audio fingerprint data for each of the segments.

5. The method of claim 1, further comprising determining, from the logarithmically-sampled data, a distortion to which the audio data has been subjected.

6. The method of claim 5, further comprising compensating the audio data for the determined distortion prior to deriving the characteristic audio fingerprint data.

7. The method of claim 5, further comprising taking the determined distortion into account when deriving the characteristic fingerprint data.

8. The method of claim 1, wherein the logarithmically-sampled data comprises a hash.

9. The method of claim 1, further comprising correlating the logarithmically-sampled data with one or more pre-existing signals.

10. A method of processing media content data, the media content data including audio, the method comprising:
- providing frequency domain data corresponding to the media content data;
- performing a log-mapping process on the frequency domain data to yield logarithmically-sampled data; and
- using the logarithmically-sampled data in a process that produces an identifier associated with the media content data.

11. The method of claim 10, further comprising generating power spectrum data corresponding to the logarithmically-sampled data, and using the power spectrum data in a process that produces an identifier associated with the media content data.

12. The method of claim 10, further comprising checking a database to identify content corresponding to the identifier.

13. The method of claim 10, further comprising:

generating plural identifiers, wherein the plural identifier are associated with plural non-identical subsets of the media content data; and storing the plural identifiers in a database for later matching against identifiers derived from unknown content data;

wherein the method is characterized by identifying plural non-identical subsets of data from the media content data, but storing identifiers in the database for only every Nth of the subsets.

14. The method of claim 13, further comprising generating identifiers only for every Nth of the subsets.

15. A method of processing digital audio data to yield an identifier relating to the digital audio data, the method comprising:

providing frequency domain data corresponding to the digital audio data;

producing power spectrum data from the frequency domain data; and performing a log-mapping process on the power spectrum data to yield logarithmically-sampled data.

16. The method of claim 15, further comprising using the logarithmically-sampled data in a process that produces an identifier corresponding to the digital audio data.

17. The method of claim 15, further comprising processing the logarithmically-sampled data, and then matching the processed data with one or more pre-existing signals.

18. A method of compiling a fingerprint database for identifying media content, wherein the media content data represents at least one of audio and video, the method comprising:

generating plural content fingerprints for plural non-identical excerpts of known media content data; and storing the plural content fingerprints in a database for later matching against fingerprint data derived from unknown content data;

wherein the method is characterized by identifying plural non-identical subsets of data from the known media content data, and storing fingerprint data in the database for only every Nth of the subsets.

19. The method of claim 18, further comprising generating content fingerprints only for every Nth of the subsets.

20. A method employing data representing image, video, or audio content data, the method comprising:

determining a distortion of the content data from an original state;

calculating a fingerprint identifier from the content data, taking into account the determined distortion; and using the calculated fingerprint identifier to identify information related to the content data.

21. The method of claim 20, further comprising capturing audio, image, or video content data using a sensor in a handheld wireless device.

22. The method of claim 21, further comprising performing the determining and calculating in the handheld wireless device.

23. The method of claim 20, further comprising compensating the content data for the determined distortion prior to calculating the fingerprint.

24. The method of claim 20, further comprising determining a match between the calculated fingerprint identifier and a reference set of previously-calculated fingerprint identifiers.

25. The method of claim 20, wherein the determining employs calibration data conveyed with the content data.

26. The method of claim 25, wherein the calibration data is included in header information accompanying the content data, hidden in an unused channel or data area, or embedded in a digital watermark.

27. A method of deriving a fingerprint from data representing image, video, or audio content, the method comprising:

determining perceptually relevant features of the content; and producing a fingerprint for the content based, at least in part, on the perceptually relevant features;

wherein the perceptually relevant features are of at least two different types, and one of the types comprises edges, center of mass, magnitude peaks, frequency characteristics, or Hough transform data.

28. A method of deriving a fingerprint from data representing image, video, or audio content, the method comprising:

applying a Hough transform to the content, to produce Hough output data therefrom; and producing a fingerprint for the content based, at least in part, on the Hough output data.

29. A method of identifying content based on fingerprint data derived therefrom, the content comprising data representing audio, image, or video content, the method comprising:

computing a fingerprint from the content;

storing the fingerprint in a database;

producing one or more variants of the content by applying one or more manipulation processes thereto, wherein at least one process comprises compression, transformation, or D/A conversion;

computing one or more fingerprints corresponding to the one or more variants of the content;

storing the one or more fingerprints in the database; and associating the stored fingerprints in the database;

wherein the content corresponds to a set of plural associated fingerprints in the database.

30. The method of claim 29, further comprising:

computing a fingerprint from unknown content;

producing one or more variants of the unknown content, by applying the one or more manipulation processes thereto;

computing one or more fingerprints corresponding to the one or more variants of the unknown content; and by reference to the fingerprints of the unknown content, determining a match to a set of associated fingerprints stored in the database.

31. The method of claim 29, wherein the associating comprises linking the stored fingerprints by a linked list data structure.

32. The method of claim 29, wherein the computing comprises identifying perceptually relevant features of at least two different types in the content, and computing the fingerprints based thereon.

33. A method of processing audio, image, or video content, the method comprising:

receiving the content in a first format;

encoding the content into a second, different format;

storing the encoded content in a data structure on a storage medium; and storing fingerprint-related data corresponding to the content, in the same data structure.

34. The method of claim 33, further comprising:

obtaining calibration data associated with the content in the first format;

using the calibration data in computing fingerprint data corresponding to the content; and storing the fingerprint data in the data structure.

35. The method of claim 33, further comprising storing the fingerprint-related data in a header field of the data structure.

36. The method of claim 33, further comprising deriving fingerprint data from data representing audio, image, or video information, and storing the derived fingerprint data in the data structure.

37. A method of processing audio, image, or video content, the method comprising:

applying a watermark decoding process to the content to derive plural-bit digital watermark data steganographically encoded in the content;

applying a fingerprinting process to the content to derive fingerprint data corresponding to the content;

transmitting both the digital watermark data and the fingerprint data;

receiving response data based on at least some of the transmitted data; and taking an action based on the response data.

38. The method of claim 37, wherein the digital watermark data and the fingerprint data are both transmitted to a remote computer, wherein the remote computer forwards the fingerprint data to a further computer identified by reference to the digital watermark data.

39. The method of claim 37, wherein the action comprises storing the response data in a data structure that also stores the content.

40. A method of pattern recognition using image, or video input data, the method comprising:

determining an affine transformation of imagery represented in the input data; and taking the determined affine transformation into account in applying a pattern recognition process to the input data.

41. The method of claim 40, further comprising detecting calibration information steganographically encoded in the input data.

42. The method of claim 41, further comprising determining affine transformation by reference to the calibration information, and counter-acting the affine transformation prior to applying the image recognition process.

43. A method of processing audio, image, or video content, the method comprising:

detecting watermark data steganographically encoded in audio, image, or video information of the content; and controlling a fingerprinting operation on the content, or use of data resulting therefrom, in accordance with the detected watermark data.

44. The method of claim 43, wherein the controlling comprises triggering application of a fingerprinting operation, depending on a state of the watermark data.

45. The method of claim 43, further comprising performing the fingerprinting operation on the content, and performing one of plural possible operations with resulting fingerprint data, in accordance with the watermark data.

46. The method of claim 43, further comprising:

performing the fingerprinting operation on the content, to produce content fingerprint data;

using the detected watermark data to narrow a field of search within a database of reference fingerprint data; and searching for a match with the content fingerprint data in the narrowed field of search.

47. A method of processing audio, image, or video content, the method comprising:

deriving essentially unique identification information for the audio, image, or video content, based at least in part on information—comprising data representing audio, image, or video information—associated with the content;

searching a memory for a reference data which corresponds with the derived identification information;

identifying content metadata associated with the reference data; and taking an action based on the content metadata;

wherein the searching comprises interrogating a content addressable memory with the derived information.

48. The method of claim 47, wherein the content is stored on a handheld consumer electronic wireless device, and the action comprises presenting information related to the audio, image, or video content on a display of the device.

49. The method of claim 47, wherein the deriving comprises applying an algorithm based on perceptually significant features of the content.

50. An article of manufacture including a computer-readable medium having instructions stored thereon that, if executed by a computing device, cause the computing device to perform operations comprising:

pre-processing audio data;

deriving characteristic audio fingerprint data from the pre-processed data; and sending the characteristic audio fingerprint data to a database, which can identify earlier-stored data that corresponds to the characteristic audio fingerprint data to thereby identify content that matches the media content;

wherein the pre-processing comprises performing a log-mapping process based on a frequency-domain representation of the audio data to yield logarithmically-sampled data, prior to deriving the characteristic audio fingerprint data.

51. An apparatus comprising:

a processor; and a computer-readable medium operatively connected to the processor having instructions stored thereon that, if executed by the processor, cause the apparatus to:

pre-process audio data;

derive characteristic audio fingerprint data from the pre-processed data; and send the characteristic audio fingerprint data to a database, which can identify earlier- stored data that corresponds to the characteristic audio fingerprint data to thereby identify content that matches the media content;

wherein the pre-processing comprises performing a log-mapping process based on a frequency-domain representation of the audio data to yield logarithmically-sampled data, prior to deriving the characteristic audio fingerprint data.

52. An article of manufacture including a computer-readable medium having instructions stored thereon that, if executed by a computing device, cause the computing device to perform operations comprising:

providing frequency domain data corresponding to media content data;

performing a log-mapping process on the frequency domain data to yield logarithmically-sampled data; and using the logarithmically-sampled data in a process that produces an identifier associated with the media content data.

53. An apparatus comprising:

a processor; and a computer-readable medium operatively connected to the processor having instructions stored thereon that, if executed by the processor, cause the apparatus to:

provide frequency domain data corresponding to media content data;

perform a log-mapping process on the frequency domain data to yield logarithmically-sampled data; and use the logarithmically-sampled data in a process that produces an identifier associated with the media content data.

54. An article of manufacture including a computer-readable medium having instructions stored thereon that, if executed by a computing device, cause the computing device to perform operations comprising:

providing frequency domain data corresponding to digital audio data producing power spectrum data from the frequency domain data; and performing a log-mapping process on the power spectrum data to yield logarithmically-sampled data.

55. An apparatus comprising:

a processor; and a computer-readable medium operatively connected to the processor having instructions stored thereon that, if executed by the processor, cause the apparatus to:

provide frequency domain data corresponding to digital audio data;

produce power spectrum data from the frequency domain data; and perform a log-mapping process on the power spectrum data to yield logarithmically-sampled data.

56. An article of manufacture including a computer-readable medium having instructions stored thereon that, if executed by a computing device, cause the computing device to perform operations comprising:

generating plural content fingerprints for plural non-identical excerpts of known media content data; and storing the plural content fingerprints in a database for later matching against fingerprint data derived from unknown content data;

wherein the method is characterized by identifying plural non-identical subsets of data from the known media content data, and storing fingerprint data in the database for only every Nth of the subsets.

57. An apparatus comprising:

a processor; and a computer-readable medium operatively connected to the processor having instructions stored thereon that, if executed by the processor, cause the apparatus to:

generate plural content fingerprints for plural non-identical excerpts of known media content data; and store the plural content fingerprints in a database for later matching against fingerprint data derived from unknown content data;

wherein the method is characterized by identifying plural non-identical subsets of data from the known media content data, and storing fingerprint data in the database for only every Nth of the subsets.

58. An article of manufacture including a computer-readable medium having instructions stored thereon that, if executed by a computing device, cause the computing device to perform operations comprising:

determining a distortion of content data from an original state;

calculating a fingerprint identifier from the content data , taking into account the determined distortion; and using the calculated fingerprint identifier to identify information related to the content data.

59. An apparatus comprising:

a processor; and a computer-readable medium operatively connected to the processor having instructions stored thereon that, if executed by the processor, cause the apparatus to:

determine a distortion of the content data from an original state;

calculate a fingerprint identifier from the content data, taking into account the determined distortion; and use the calculated fingerprint identifier to identify information related to the content data.

60. An article of manufacture including a computer-readable medium having instructions stored thereon that, if executed by a computing device, cause the computing device to perform operations comprising:

determining perceptually relevant features of image, video, or audio content; and producing a fingerprint for the content based, at least in part, on the perceptually relevant features;

wherein the perceptually relevant features are of at least two different types, and one of the types comprises edges, center of mass, magnitude peaks, frequency characteristics, or Hough transform data.

61. An apparatus comprising:

a processor; and a computer-readable medium operatively connected to the processor having instructions stored thereon that, if executed by the processor, cause the apparatus to:

determine perceptually relevant features of image, video, or audio content; and produce a fingerprint for the content based, at least in part, on the perceptually relevant features;

wherein the perceptually relevant features are of at least two different types, and one of the types comprises edges, center of mass, magnitude peaks, frequency characteristics, or Hough transform data.

62. An article of manufacture including a computer-readable medium having instructions stored thereon that, if executed by a computing device, cause the computing device to perform operations comprising:

applying a Hough transform to image, video, or audio content, to produce Hough output data therefrom; and producing a fingerprint for the content based, at least in part, on the Hough output data.

63. An apparatus comprising:

a processor; and a computer-readable medium operatively connected to the processor having instructions stored thereon that, if executed by the processor, cause the apparatus to:

apply a Hough transform to image, video, or audio content, to produce Hough output data therefrom; and produce a fingerprint for the content based, at least in part, on the Hough output data.

64. An article of manufacture including a computer-readable medium having instructions stored thereon that, if executed by a computing device, cause the computing device to perform operations comprising:

computing a fingerprint from audio, image, or video content;

storing the fingerprint in a database;

producing one or more variants of the content by applying one or more manipulation processes thereto, wherein at least one process comprises compression, transformation, or D/A conversion;

computing one or more fingerprints corresponding to the one or more variants of the content;

storing the one or more fingerprints in the database; and associating the stored fingerprints in the database;

wherein the content corresponds to a set of plural associated fingerprints in the database.

65. An apparatus comprising:

a processor; and a computer-readable medium operatively connected to the processor having instructions stored thereon that, if executed by the processor, cause the apparatus to:

compute a fingerprint from audio, image, or video content;

store the fingerprint in a database;

produce one or more variants of the content by applying one or more manipulation processes thereto, wherein at least one process comprises compression, transformation, or D/A conversion;

compute one or more fingerprints corresponding to the one or more variants of the content;

store the one or more fingerprints in the database; and associate the stored fingerprints in the database;

wherein the content corresponds to a set of plural associated fingerprints in the database.

66. An article of manufacture including a computer-readable medium having instructions stored thereon that, if executed by a computing device, cause the computing device to perform operations comprising:

applying a watermark decoding process to audio, image, or video content to derive plural-bit digital watermark data steganographically encoded in the content;

applying a fingerprinting process to the content to derive fingerprint data corresponding to the content;

transmitting both the digital watermark data and the fingerprint data;

receiving response data based on at least some of the transmitted data;

and taking an action based on the response data.

67. An apparatus comprising:

a processor; and a computer-readable medium operatively connected to the processor having instructions stored thereon that, if executed by the processor, cause the apparatus to:

apply a watermark decoding process to audio, image, or video content to derive plural-bit digital watermark data steganographically encoded in the content;

apply a fingerprinting process to the content to derive fingerprint data corresponding to the content;

transmit both the digital watermark data and the fingerprint data;

receive response data based on at least some of the transmitted data; and take an action based on the response data.

68. An article of manufacture including a computer-readable medium having instructions stored thereon that, if executed by a computing device, cause the computing device to perform operations comprising:

applying a watermark decoding process to audio, image, or video content to derive plural-bit digital watermark data steganographically encoded in the content;

applying a fingerprinting process to the content to derive fingerprint data corresponding to the content;

transmitting both the digital watermark data and the fingerprint data;

receiving response data based on at least some of the transmitted data; and taking an action based on the response data.

69. An apparatus comprising:

a processor; and a computer-readable medium operatively connected to the processor having instructions stored thereon that, if executed by the processor, cause the apparatus to:

apply a watermark decoding process to audio, image, or video content to derive plural- bit digital watermark data steganographically encoded in the content;

apply a fingerprinting process to the content to derive fingerprint data corresponding to the content;

transmit both the digital watermark data and the fingerprint data;

receive response data based on at least some of the transmitted data; and take an action based on the response data.

70. An article of manufacture including a computer-readable medium having instructions stored thereon that, if executed by a computing device, cause the computing device to perform operations comprising:

determining an affine transformation of imagery represented in image or video input data; and taking the determined affine transformation into account in applying a pattern recognition process to the input data.

71. An apparatus comprising:

a processor; and a computer-readable medium operatively connected to the processor having instructions stored thereon that, if executed by the processor, cause the apparatus to:

determine an affine transformation of imagery represented in image or video input data; and apply a pattern recognition process to the input data taking the determined affine transformation into account.

72. An article of manufacture including a computer-readable medium having instructions stored thereon that, if executed by a computing device, cause the computing device to perform operations comprising:

detecting watermark data steganographically encoded in audio, image, or video information of audio, image, or video content; and controlling a fingerprinting operation on the content, or use of data resulting therefrom, in accordance with the detected watermark data.

73. An apparatus comprising:

a processor; and a computer-readable medium operatively connected to the processor having instructions stored thereon that, if executed by the processor, cause the apparatus to:

detect watermark data steganographically encoded in audio, image, or video information of audio, image, or video content; and control a fingerprinting operation on the content, or use of data resulting therefrom, in accordance with the detected watermark data.

74. An article of manufacture including a computer-readable medium having instructions stored thereon that, if executed by a computing device, cause the computing device to perform operations comprising:

deriving essentially unique identification information for the audio, image, or video content, based at least in part on information—comprising data representing audio, image, or video information—associated with audio, image, or video content;

searching a memory for a reference data which corresponds with the derived identification information;

identifying content metadata associated with the reference data; and taking an action based on the content metadata;

wherein the searching comprises interrogating a content addressable memory with the derived information.

75. An apparatus comprising:

a processor; and a computer-readable medium operatively connected to the processor having instructions stored thereon that, if executed by the processor, cause the apparatus to:

derive essentially unique identification information for the audio, image, or video content, based at least in part on information—comprising data representing audio, image, or video information—associated with audio, image, or video content;

search a memory for a reference data which corresponds with the derived identification information;

identify content metadata associated with the reference data; and take an action based on the content metadata;

wherein the searching comprises interrogating a content addressable memory with the derived information.

* * * * *

UNITED STATES PATENT AND TRADEMARK OFFICE

CERTIFICATE OF CORRECTION

PATENT NO. : 7,930,546 B2
APPLICATION NO. : 11/619123
DATED : April 19, 2011
INVENTOR(S) : Geoffrey B. Rhoads, Hugh L. Brunk and Kenneth L. Levy It is certified that error appears in the above-identified patent and that said Letters Patent is hereby corrected as shown below:

ON THE FRONT FACE OF THE PATENT

Item (63) under Related U.S. Application Data, please amend the paragraph as follows:

Related U.S. Application Data

(63) Continuation-in-part of allowed application Ser. No. 10/336,650, filed Jan. 2, 2003, now U.S. Pat. No. 7,158,654, which is a continuation-in-part of application No. 10/202,367, filed on Jul. 22, 2002, now Pat. No. 6,704,869, which is a continuation of application No. 09/566,533, filed on May 8, 2000, now Pat. No. 6,424,725, which is a continuation-in-part of application No. 09/452,023, filed on Nov. 30, 1999, now Pat. No. 6,408,082, application No. 11/619,123, which is a continuation-in-part of application No. 09/186,962, filed on Nov. 5, 1998, now Pat. No. 7,171,016, which is a continuation of application No. 08/649,419, filed on May 16, 1996, now Pat. 5,862,260, application No. 11/619,123, which is a continuation-in-part of application No. 10/027,783, filed on Dec. 19, 2001, now Pat. No. 7,289,643, application No. 11/619,123, which is a continuation-in-part of application No. 10/338,031, filed on Jan. 6, 2003, which is a continuation of application No. 09/563,664, filed on ~~Dec. 30, 1999~~ May 2, 2000, now U.S. Pat. No. 6,505,160.

IN THE SPECIFICATION, COLUMN 1, LINES 28-29

Delete "Dec. 30, 1999", and insert -- May 2, 2000 --.

Signed and Sealed this
Ninth Day of August, 2011

David J. Kappos
*Director of the United States Patent and Trademark Office*